Figure 1:
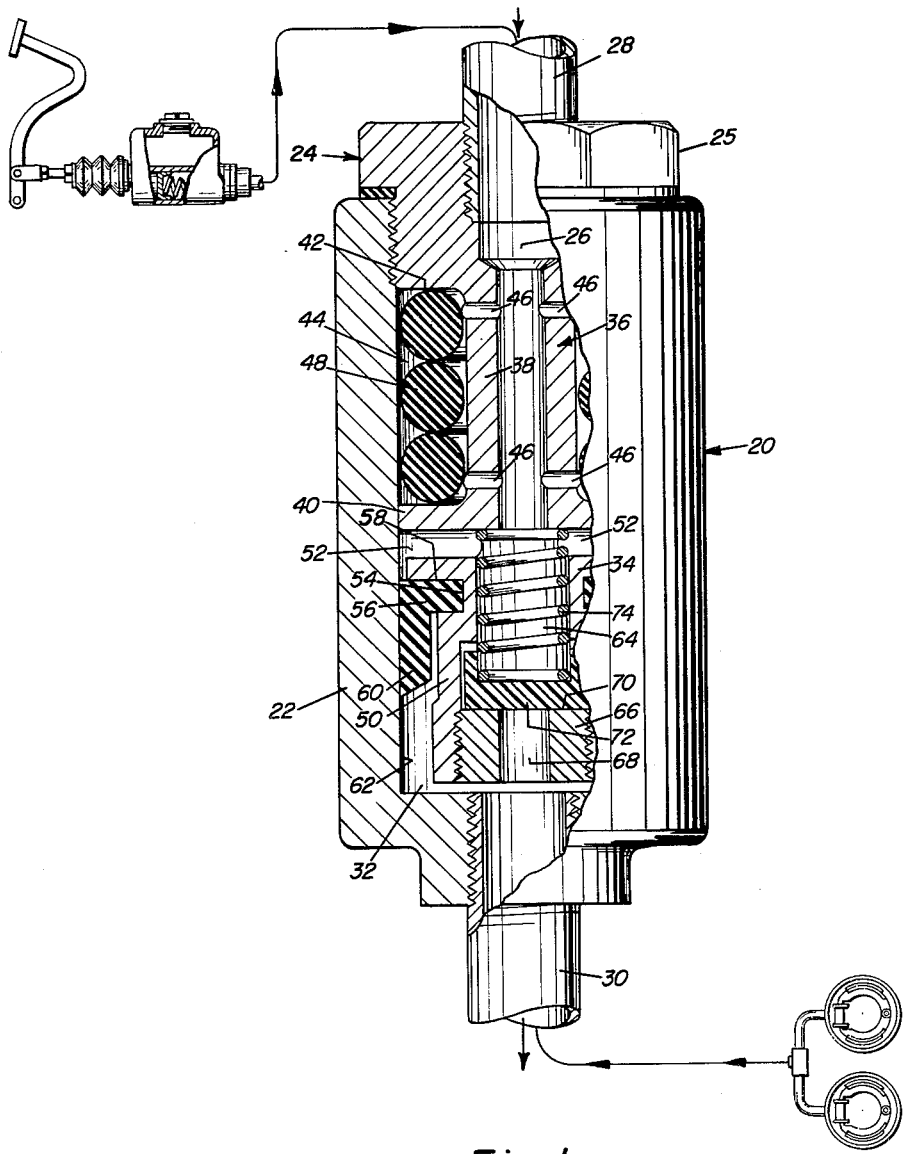

Oct. 26, 1965

G. E. PORTER 3,213,624

BRAKE ARRESTER

Filed July 22, 1963

2 Sheets-Sheet 1

INVENTOR.
GILBERT E. PORTER

BY

ATTORNEYS

United States Patent Office 3,213,624
Patented Oct. 26, 1965

3,213,624
BRAKE ARRESTER
Gilbert E. Porter, Escondido, Calif., assignor to
Hermine S. Reid, Escondido, Calif.
Filed July 22, 1963, Ser. No. 296,797
14 Claims. (Cl. 60—54.5)

The present invention relates to a braking system such as that employed in road vehicles. Such system is shown in the Letters Patent to Baldwin, No. 2,991,797, and in my Letters Patent No. 2,770,948. Usually such systems employ a source of high pressure such as a master cylinder, under the control of the operator of the vehicle, and brake shoe actuating apparatus.

The present invention includes a device which is interposed between the source of high pressure and the brake shoe actuating apparatus. The device includes a casing having a passage connected with the source of high pressure for receiving and returning fluid from and to the source and also includes a passage connected with a brake shoe actuating apparatus for the passage of fluid to and from the brake shoe actuating apparatus.

A check valve is interposed between the two passages for the flow of fluid from the first mentioned passage to the brake shoe actuating apparatus through the second mentioned passage, and this check valve prevents the flow in the opposite direction. A second check valve is also interposed between the passages for the flow of fluid from the brake shoe actuating apparatus through the second mentioned passage and thence through the casing and the first mentioned passage, and this latter check valve prevents the flow in the opposite direction.

A fluid-compressible means is disposed in the casing intermediate the first mentioned passage and the check valve. The fluid-compressible means is herein shown as a plurality of rubber or synthetic rubber rings.

Further features and the advantages of the present invention will be apparent from the following description, reference being had to the accompanying drawings wherein preferred embodiments of the invention are illustrated.

Figure 2:
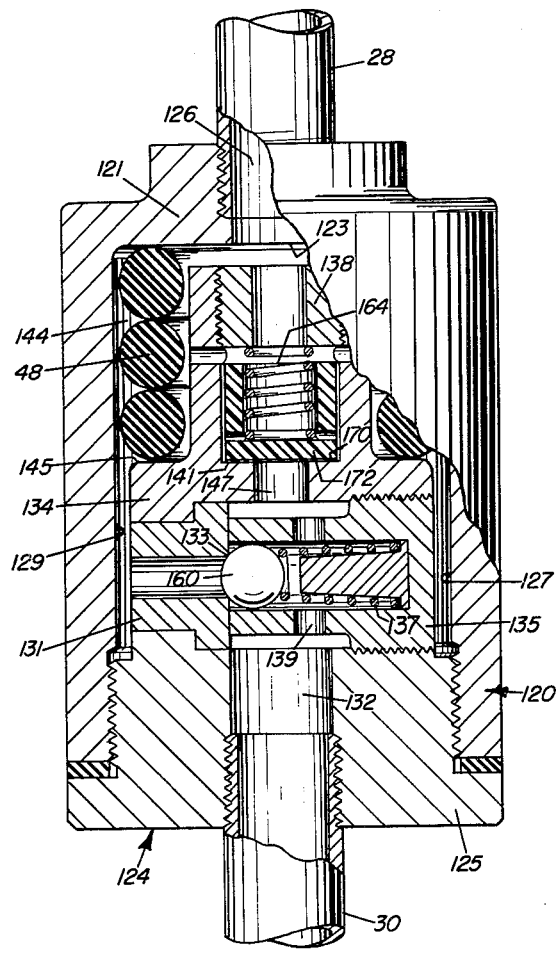

In the drawing:

FIG. 1 is a front view of the improved device, part thereof being shown in longitudinal cross section; and FIG. 2 is a view of another embodiment of the invention, part thereof being shown in longitudinal cross section.

Referring more in detail to FIG. 1 of the drawing, the device is shown generally at 20 including a casing 22 which is generally cylindrical in shape and is closed by a closure member 24 having a head 25 which is fastened to the top of the casing by threaded engagement therewith.

The casing is connected through a passage 26 to a source of high pressure, for example, any one of the standard type of master cylinders (not shown) of a fluid brake system, by a pipe 28. This pipe is threaded through the top of the closure member head 25. The bottom of the casing is connected to a brake shoe actuating apparatus by a pipe 30. Such brake shoe actuating apparatus may be any of the standard types. A lower portion of the casing 22 is defined as a passage 32.

The closure member 24 includes a section 34 which extends downwardly through the casing. This section 24 includes a spool shaped portion generally indicated at 36 including a hollow shank 38 forming a continuation of passage 26. This spool shaped portion 36 includes a circular portion 40 which cooperates with the wall 42 and the upper portion of cylindrical casing 22 to form a chamber 44. This chamber is interconnected with the hollow of the shank and passage 26 through a series of passages 46. A fluid-compressible means is disposed within the chamber 44 and is herein shown as comprising a plurality of rubber rings 48. These rubber rings have a hardness of approximately 40 Shore.

The lower portion 50 of the closure member 24 is a continuation of the upper section 36, there being a plurality of fluid passages 52 therebetween. The periphery of the upper part of portion 50 is spaced from the interior of the circular wall of the casing. Portion 50 is provided with a groove 54 for receiving a resilient element 56. This resilient element is circular and inverted L-shaped in cross section, the portion 58 extends into the groove 54 and the skirt portion 60 closely engages the cylindrical wall 62 of the casing. This resilient element 56 may be formed of rubber or "Teflon." It forms a check valve in that when the pressure is applied by the master cylinder, fluid can pass downwardly from passage 52, about the periphery of the upper part of the portion 50, about the resilient element. However, when fluid is applied in the opposing direction, the skirt is forced against the cylindrical wall 62 to prevent the flow through the passageways 52.

The lower section 50 is hollow to form a chamber 64. The extreme lower end of this section 34 is threaded for receiving a stop 66 having a passage 68 therethrough. The upper portion of this stop 66 forms a valve seat 70 for a cup shaped valve 72 which is disposed within the chamber 64. The top of this chamber is in open communication with the hollow shank. A light coil spring 74 is interposed between the cup and the bottom of the upper section 36.

When pressure is applied by the master cylinder to the casing, the valve 72 is held against the seat 70 having been moved there by gravity and assisted by the spring 74. The fluid will pass about the skirt 60 of the check valve, through the passage 32 and pipe 30 to the brake shoe actuating mechanism. When the pressure is released, through the master cylinder, the fluid will pass upwardly through the pipe 30, passages 32 and 68, such pressure lifting the valve 72 from its seat 70 whereby the fluid can return to the master cylinder through the hollow shank, the passage 26 and pipe 28.

Referring now to the embodiment shown in FIG. 2, wherein the cylindrical casing is shown at 120. In this embodiment, casing 120 is in the form of an inverted cup, the top wall 121 of which is threaded for receiving the pipe 28, which latter is connected with the source of high fluid pressure, such as a master cylinder. The bottom of the casing is internally threaded to receive the bottom portion 125 of the closure member 124. The lower end of member 124 is threaded for receiving the pipe 30, the latter being connected with the brake shoe actuating apparatus.

The upper portion 138 of the closure member 124 is reduced in diameter and stops short of the inside surface 123 of the top wall 121. The fluid-compressible rings 48 surround the portion 138. The portion 134, which is intermediate the upper portion 138 and bottom portion 125 is larger in diameter than portion 138 but is spaced from the cylindrical inside wall 127 of the casing 120 so as to form a passage 129 thereabout. Portion 134 is drilled transversely for receiving a hollow valve seat member 131 forming a valve seat 133. Portion 134 is also provided with a second drilling in alignment with the first but of larger diameter and is threaded for receiving a plug 135. This plug is hollow for receiving a ball type check valve 160 which is yieldingly urged upon seat 133 by a coil spring 137. The area 139 about valve 160 is connected with passage 132 whereby, when valve 160 is removed from its seat, fluid can pass from pipe 28 through passage 126, about upper portion 138 of member 124, passage 129, through the hollow valve seat member 131, about valve seat 133 and ball valve 160 to passage 132 and thence by pipe 30 to the brake shoe actuating apparatus.

The upper portion 138 is hollow, which, together with a transverse wall 141 in the intermediate portion 134, provides an open top chamber 164, the latter being in open communication with passage 126 and the chamber 144. Chamber 144 is formed by upper portion 138 of member 124, casing 120 and the annular top surface 145 of portion 134 of member 124. Surface 145 supports the lower ring 48 which in turn supports the upper rings.

Wall 141 of portion 134 is drilled to form a passage 147 which latter is in open communication with valve chamber area 139. Wall 141 forms a valve seat 170 for a cup-shaped valve 172, the latter being disposed in cylindrical chamber 164. Spring 74 normally urges valve 172 toward its seat 170. The diameter of chamber 164 is larger than the diameter of cylindrical valve 172, whereby fluid can flow readily upwardly about the valve when it is lifted off of its seat. The upper part of portion 138 is threaded for receiving a hollow stop member for spring 74.

From the foregoing it will be seen that as pressure is applied from a source of high fluid pressure, such as a master cylinder of a braking system, fluid will flow through the pipe 28, inlet 126, chamber 144, passage 129, through the hollow valve member 131, causing the valve 160 to be lifted from its seat 133. When the valve is lifted from its seat, the fluid will flow about the area 139 through the passage 132 and pipe 30 to the brake shoe actuating apparatus. When the pressure is released, the pressure in the brake shoe actuating apparatus, being higher than that as it flows through pipe 28, will cause the valve 160 to close upon its seat whereby valve 160 functions as a check valve. Upon further release of the pressure through pipe 28, the fluid will flow from the brake shoe actuating apparatus through pipe 130, area 139, passage 147, lifting the valve 172 from its seat. The fluid will flow about and through the valve 172, namely through chamber 164 and thence by pipe 138 through the pipe 28.

Quite often, particularly when quick or emergency braking action is applied to the master cylinder, part of this high pressure is absorbed by compressing the rubber rings 48. In this manner, the excessive high pressure is not transmitted to the brake shoe actuating mechanism whereby the wheels of the vehicle are not locked. In this manner, skidding of the vehicle is prevented. In other words, the fluid-compressible rings function as a cushion for absorbing the excessive shock created by the quick braking action of the master cylinder.

The ratio between the closing pressure on either of the valves 72 or 172 is a multiple of the opening pressure on the valve, herein shown as approximately four to one. By reason of this ratio, in combination with the fluid-compressible means, braking action by foot, after emergency foot braking action, can be released slightly yet the necessary braking action is maintained.

It has been found in actual practice that by the use of the present invention deceleration of the automobile can be materially reduced from the instant that pressure is applied to the brake to the instant that the automobile is brought to a complete stop. It has also been found in actual practice that the sudden shock which heretofore caused occupants of the automobile to be thrown forwardly through the windshield of the car, when emergency braking action is applied, has been eliminated completely. It has also been found in actual practice that there is no grabbing action by one brake shoe over the other which normally would effect the turning of the automobile. Also, it has been found that distortion of the brake drums and other brake parts has been eliminated.

The present system is applicable to air brake systems as well as hydraulic systems. It is also to be understood that where the word "rubber" is used, that word is also used to denote its equivalents such as "synthetic rubber." Check valve 56 may be made of "Teflon" or equivalent material.

Normally the valves 72 and 172 will be held upon their seats by gravity and the spring 74 is merely employed for assuring that the valves are on their seats at the time that pressure is applied to the master cylinder.

While the forms of embodiments herein shown and described constitute preferred forms, it is to be understood that other forms may be adopted falling within the scope of the claims that follow.

I claim:

1. In a fluid type braking system for a vehicle, which braking system includes:

a master cylinder, fluid actuated brake shoe actuating mechanism, and an improved valve mechanism interposed between the master cylinder and the brake shoe actuating mechanism, which improved valve mechanism comprises:

(A) a closed casing having:
  (1) a fluid passage connectable with the master cylinder;
  (2) a fluid passage connectable with a brake shoe actuating mechanism;
 (B) a check valve for the flow of fluid from the first mentioned passage to the second mentioned passage and for preventing the flow of fluid in the reverse direction;
 (C) a second valve for the flow of fluid from the second mentioned passage to the first mentioned passage and for preventing the flow from the first mentioned passage to the second mentioned passage;
 (D) and fluid-compressible means compressible in response to pressure in excess of that necessary to open the first mentioned check valve, disposed in the casing intermediate the first mentioned passage and the first mentioned check valve whereby excessive high pressure is absorbed by the fluid-compressible means.

2. A valve mechanism as defined in claim 1, characterized in that the casing forms a cylinder and in that one of said valves comprises a flexible ring.

3. A valve mechanism as defined in claim 1, characterized in that the casing forms a cylinder and in that the first mentioned check valve comprises a flexible ring.

4. A valve mechanism as defined in claim 1, characterized in that the fluid-compressible means is rubber.

5. A valve mechanism as defined in claim 1, characterized in that the fluid-compressible means comprises a rubber ring.

6. A valve mechanism as defined in claim 1, characterized in that the second mentioned valve is normally urged toward closed position when pressure on opposite sides thereof is substantially equal.

7. In a fluid type braking system for a vehicle, which braking system includes:

a master cylinder, fluid actuated brake shoe actuating mechanism, and an improved valve mechanism interposed between the master cylinder and the brake shoe actuating mechanism, which improved valve mechanism comprises:

(A) A casing including a closure member, said casing having:
  (1) A fluid passage connectable with the source of high pressure;
  (2) a fluid passage connectable with a brake shoe actuating mechanism;
  (3) said closure member including a portion extending into the casing;
   (a) a check valve carried by said portion for the flow of fluid from the first mentioned passage to the second mentioned passage and for preventing the flow of fluid in the reverse direction;
   (b) a second check valve carried by said portion for the flow of fluid from the second mentioned passage to the first mentioned passage and for preventing the flow from the first mentioned passage to the second mentioned passage;

(B) and fluid-compressible means compressible in response to pressure in excess of that necessary to open the first mentioned check valve disposed in the casing intermediate the first mentioned passage and the first mentioned check valve whereby excessive high pressure is absorbed by the fluid-compressible means.

8. A valve mechanism as defined in claim 7, characterized in that the casing forms a cylinder and that one of said valves comprises a flexible ring surrounding said portion of the closure member.

9. A valve mechanism as defined in claim 7, characterized in that the casing forms a cylinder and that the first mentioned valve comprises a flexible ring surrounding said portion of the closure member.

10. A valve mechanism as defined in claim 7, characterized in that the fluid-compressible means is rubber.

11. A valve mechanism as defined in claim 7, characterized in that the fluid-compressible means comprises a rubber ring surrounding said portion of the closure member.

12. A valve mechanism as defined in claim 7, characterized in that the casing forms a cylinder and that the portion of the closure member includes a spool-like section having a hollow shank, said section being disposed in the cylinder to form a chamber, said rubber ring being disposed in the chamber about the shank, said hollow shank being in open communication with the first mentioned passage and said cylinder.

13. A valve mechanism as defined in claim 1, characterized in that the fluid-compressible means is disposed also between the first mentioned passage and the second mentioned check valve.

14. A valve mechanism as defined in claim 7, characterized in that the fluid-compressible means is disposed also between the first mentioned passage and the second mentioned check valve.

References Cited by the Examiner

UNITED STATES PATENTS

| | | | |
|---|---|---|---|
| 2,357,386 | 9/44 | Dick | 60—54.5 |
| 2,941,549 | 6/60 | Ward | 138—30 |
| 2,991,797 | 7/61 | Baldwin | 137—493 |
| 3,067,770 | 12/62 | Fancher | 137—493 |

JULIUS E. WEST, *Primary Examiner.*

ROBERT R. BUNEVICH, *Examiner.*